(12) United States Patent
Bates, Jr.

(10) Patent No.: US 7,353,898 B1
(45) Date of Patent: Apr. 8, 2008

(54) INTEGRATED HEAT EXCHANGER AND ENGINE MOUNT FOR A SNOWMOBILE

(75) Inventor: Richard H Bates, Jr., Badger, MN (US)

(73) Assignee: Polaris Industries Inc., Medina, MN (US)

( * ) Notice: Subject to any disclaimer, the term of this patent is extended or adjusted under 35 U.S.C. 154(b) by 286 days.

(21) Appl. No.: 11/066,833

(22) Filed: Feb. 24, 2005

(51) Int. Cl.
*B60K 11/00* (2006.01)
*B60K 13/02* (2006.01)
*B60K 11/04* (2006.01)
*B60K 17/34* (2006.01)
*B62B 19/00* (2006.01)
*B62M 27/02* (2006.01)
*B62M 29/00* (2006.01)

(52) U.S. Cl. ............... 180/68.1; 180/68.2; 180/68.3; 180/68.4; 180/184; 180/233; 180/190

(58) Field of Classification Search ............... 180/68.1, 180/68.2, 68.3, 68.4, 184, 233, 190
See application file for complete search history.

(56) References Cited

U.S. PATENT DOCUMENTS

| | | | | |
|---|---|---|---|---|
| 1,784,766 A * | 12/1930 | Stranahan | ................... | 180/68.4 |
| 2,078,067 A * | 4/1937 | Duesenberg | ............... | 180/68.1 |
| 3,763,953 A * | 10/1973 | Yoda et al. | ................ | 180/68.4 |
| 3,776,354 A | 12/1973 | Duclo | ......................... | 180/296 |
| 3,810,518 A | 5/1974 | Smale | .......................... | 180/54 |
| 3,819,000 A | 6/1974 | Larsen | ........................... | 180/5 |
| 3,853,201 A | 12/1974 | Smale | .......................... | 181/53 |
| 3,870,115 A | 3/1975 | Hase | .......................... | 180/190 |
| 3,870,117 A | 3/1975 | Larsen | ........................ | 180/64 |
| 3,981,373 A | 9/1976 | Irvine | ............................. | 180/5 |
| 4,047,588 A | 9/1977 | Blass | ......................... | 180/291 |
| 4,069,882 A | 1/1978 | Leonard | ..................... | 180/190 |
| 4,657,074 A * | 4/1987 | Tomita et al. | .............. | 165/179 |
| 4,828,017 A * | 5/1989 | Watanabe et al. | ............. | 165/41 |
| 4,917,207 A | 4/1990 | Yasui | .......................... | 180/193 |
| 5,042,604 A * | 8/1991 | Tone et al. | ................. | 180/68.4 |
| 5,060,745 A | 10/1991 | Yasui | .......................... | 180/193 |
| 5,113,819 A * | 5/1992 | Murakawa et al. | ...... | 123/198 E |
| 5,232,066 A | 8/1993 | Schnelker | .................... | 180/190 |
| 5,316,079 A * | 5/1994 | Hedeen | ...................... | 165/140 |
| 5,490,574 A * | 2/1996 | Ishiizumi et al. | ........... | 180/68.1 |
| 5,607,026 A | 3/1997 | Rioux | ........................... | 180/190 |
| 5,699,872 A * | 12/1997 | Miyakawa et al. | ......... | 180/291 |
| 6,234,263 B1 | 5/2001 | Boivin | ....................... | 180/184 |
| 6,446,744 B2 | 9/2002 | Wubbolts | .................... | 180/190 |
| 6,595,311 B2 | 7/2003 | Fournier | ..................... | 180/228 |
| 6,604,600 B2 | 8/2003 | Fournier | ..................... | 180/299 |

(Continued)

FOREIGN PATENT DOCUMENTS

JP          2004161275 A2       6/2004

(Continued)

*Primary Examiner*—Christopher P. Ellis
*Assistant Examiner*—John R. Olszewski
(74) *Attorney, Agent, or Firm*—Baker & Daniels LLP

(57) ABSTRACT

An integrated heat exchanger and engine mount for a snowmobile that reinforces the snowmobile chassis is disclosed. The heat exchanger is formed with an internal passage through which a vehicle fluid may be circulated and cooled. The heat exchanger is also formed with increased rigidity to strengthen the chassis and support an engine mount.

28 Claims, 6 Drawing Sheets

U.S. PATENT DOCUMENTS

| | | | | |
|---|---|---|---|---|
| 6,651,768 B2* | 11/2003 | Fournier et al. | ............ | 180/228 |
| 6,691,815 B2* | 2/2004 | Rioux et al. | ................ | 180/292 |
| 6,695,087 B2 | 2/2004 | Fournier | .................... | 180/228 |
| 6,971,438 B2* | 12/2005 | Oki et al. | ..................... | 165/41 |
| 7,089,994 B2* | 8/2006 | Esposito et al. | .............. | 165/42 |
| 7,188,696 B2* | 3/2007 | Arnold | ....................... | 180/229 |
| 7,213,542 B2* | 5/2007 | Oshima et al. | .......... | 123/41.51 |
| 2002/0084125 A1 | 7/2002 | Scheumacher | ............. | 180/190 |
| 2005/0284677 A1* | 12/2005 | Arnold | ..................... | 180/68.4 |

FOREIGN PATENT DOCUMENTS

| | | |
|---|---|---|
| JP | 2004210283 A2 | 7/2004 |
| JP | 2004210284 A2 | 7/2004 |

* cited by examiner

INTEGRATED HEAT EXCHANGER AND ENGINE MOUNT FOR A SNOWMOBILE

FIELD SECTION

Certain embodiments of the present invention relate to heat exchangers in engine cooling systems. Some embodiments of the present invention relate to such heat exchangers that provide a rigid base against which an engine may be mounted.

BACKGROUND SECTION

Snowmobiles are popular land vehicles used as transportation vehicles or as recreational vehicles in cold and snowy conditions. In general, a snowmobile has a central frame or chassis on or around which the various components of the snowmobile are assembled. Typical snowmobiles include skis for steering, a seat, handlebars, and an endless track for propulsion mounted to a central chassis. A bulkhead is defined by a plurality of front structural members of the chassis. The engine drives a ground-engaging endless track disposed in a longitudinally extending drive tunnel formed within the chassis. The skis serve to facilitate steering as well as to provide flotation of the front of the snowmobile over the snow in which it is operated. The skis are mounted at the front body portion of the chassis. A handlebar assembly, positioned forward of the seat, is operatively linked to the skis for steering the snowmobile. The skis may be pivoted laterally to steer the snowmobile, for example, by turning the handlebars.

Past snowmobiles have used liquid cooling systems to cool their internal combustion engines. Snowmobiles with these liquid-cooled engines often have heat exchangers spaced away from the engine itself. In some of these snowmobiles, the heat exchangers are positioned within the drive tunnel that is within the snowmobile chassis. The drive track, also disposed within the drive tunnel, carries and circulates snow within the drive tunnel as the track moves. The heat exchangers are positioned adjacent the track so that some of the snow carried by the track will be thrown at the heat exchangers to provide a heat transfer. The melting of snow requires a substantial amount of heat that is removed from the coolant circulated in the heat exchangers. Typically a snowmobile with a liquid cooled engine has one of the cooling system elements placed in the front close off area of the chassis. The reason for this is that it is one of the most effective cooling area of the snowmobile due to the snow and ice that is thrown into this area from the drive track. The cooler is typically mounted to the front close off panel. On the opposite side of the close off panel typically there are some structures that are designed to receive motor mounts for isolating the engine vibration from the chassis.

It is also desirable to isolate engine vibrations from the chassis. When snowmobiles are powered by two-stroke engines, large amounts of vibration are often produced. In order to decrease the amount of vibration from the engine to the chassis, typically, engines are supported by an engine mount attached to the bottom of the engine in a way that enabled vibration absorbing elements to be placed between the engine mount and the chassis. However, such conventional engine mounts require relatively large amounts of space within the chassis for the engine and to provide the space needed to position the vibration absorbing elements.

Also, the tunnel and bulkhead have traditionally been made of a very strong but light-weight material such as aluminum. To withstand the forces encountered under normal operating conditions, reinforcing elements are added to increase the rigidity of the tunnel and bulkhead so that they do not bend or buckle under high loads. Unfortunately, this adds significantly to the overall weight of the vehicle.

As engines increase in size and weight, less space is available for within the chassis for mounting such larger and heavier engines. In addition, the chassis must be reinforced to support a heavier engine. Yet, additional reinforcements require additional chassis space. Accordingly, there exists a need for a new engine mount that can be used in a snowmobile that occupies less space, is more easily assembled and is more lightweight. Similarly, there is a need for a new front heat exchanger having such desirable properties where the chassis has less available space for both the engine and for such an new engine mount.

BRIEF SUMMARY SECTION

Certain embodiments of the invention relate to a snowmobile with a chassis, an engine, a heat exchanger, and an engine mounting assembly. The heat exchanger includes a reinforced portion that supports the engine. The heat exchanger also is mounted to the chassis, contains an inner passage for carrying heat absorbing fluid, and has an outer surface for dissipating hear from the fluid carried by the inner passage. The engine mounting assembly mounts the engine to the chassis, includes a resilient member to dampen engine vibration, and includes a connector operatively connected to the engine that directly connects to the reinforced portion of the heat exchanger to mount the engine to the chassis.

Other embodiments of the invention relate to a snowmobile having a chassis, an engine, a heat exchanger, and an engine mounting assembly. The heat exchanger is mounted to the chassis and includes a reinforced portion positioned adjacent to a chassis wall to increase the rigidity of the chassis wall. The heat exchanger contains an inner passage for carrying heat absorbing fluid and also has an outer surface for dissipating heat from the fluid in the inner passage. The engine mounting assembly mounts the engine to the chassis, and includes a connector that connects together the engine, the reinforced portion of the heat exchanger, and the chassis wall to support the engine in place.

Certain embodiments of the invention relate to a snowmobile having a chassis, an engine, and a heat exchanger. The heat exchanger includes a sealed inner passage for carrying heat absorbing fluid and includes an outer surface for dissipating heat from fluid carried by the inner passage. The heat exchanger is formed with an open-air interior cavity to increase the rigidity of the heat exchanger. The heat exchanger is mounted to the chassis to increase the rigidity of the chassis.

Certain embodiment of the invention relate to an integrated engine mount and heat exchanger for a snowmobile that includes an outer surface, an inner passage, and a reinforced engine mount portion. The outer surface has cooling fins for dissipating heat from within the heat exchanger. The inner passage is for carrying a heat absorbing fluid. The reinforced engine mount portion has an aperture for receiving and connecting to an engine mount connector.

DETAILED DESCRIPTION SECTION

Figure 1:
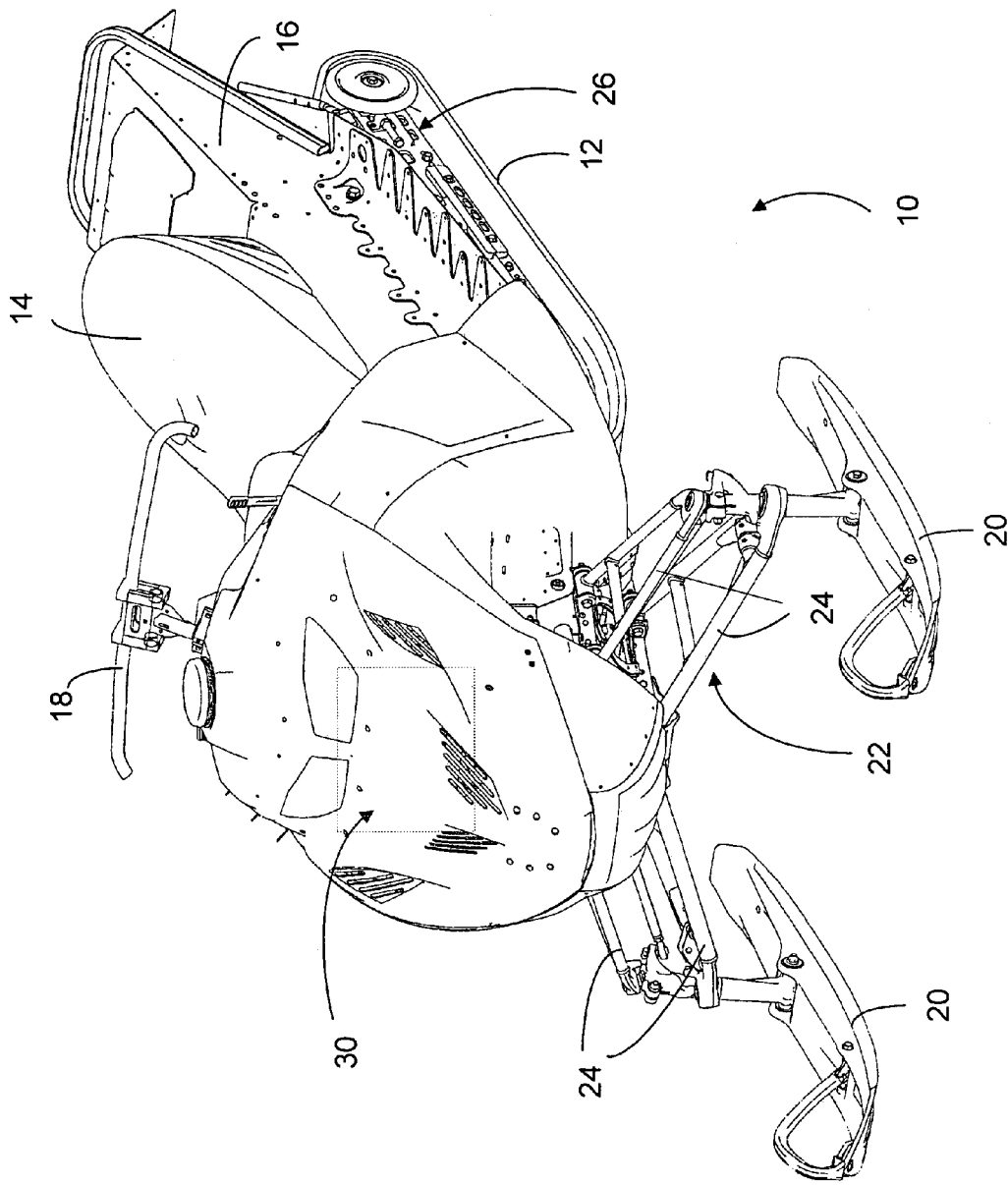
FIG. 1 is a perspective view of a snowmobile of certain embodiments of the present invention.

Referring to FIG. 1, a snowmobile 10 is depicted having an endless track 12, a seat 14, a chassis 16, a handlebar 18, a pair of front steerable skis 20, and a front suspension system 22. The seat 14 accommodates seating an operator in straddle fashion. The handlebar 18 is provided for use by the operator and is positioned forward of the operator's seat. The handlebar 18 is conventionally connected to the skis 20 for steering the snowmobile 10. A front suspension system 22 suspends the skis 20. The skis 20 are positioned at the laterally outermost end portions of suspension arms 24, which suspension arms 24 often have, e.g., shock absorbers with coil springs, to absorb vibrations as the snowmobile passes over uneven terrain. The skis 20 and the suspension arms are constructed so that the skis 20 can be pivoted laterally to steer the snowmobile, e.g. by turning the handlebars 18.

Figure 2:
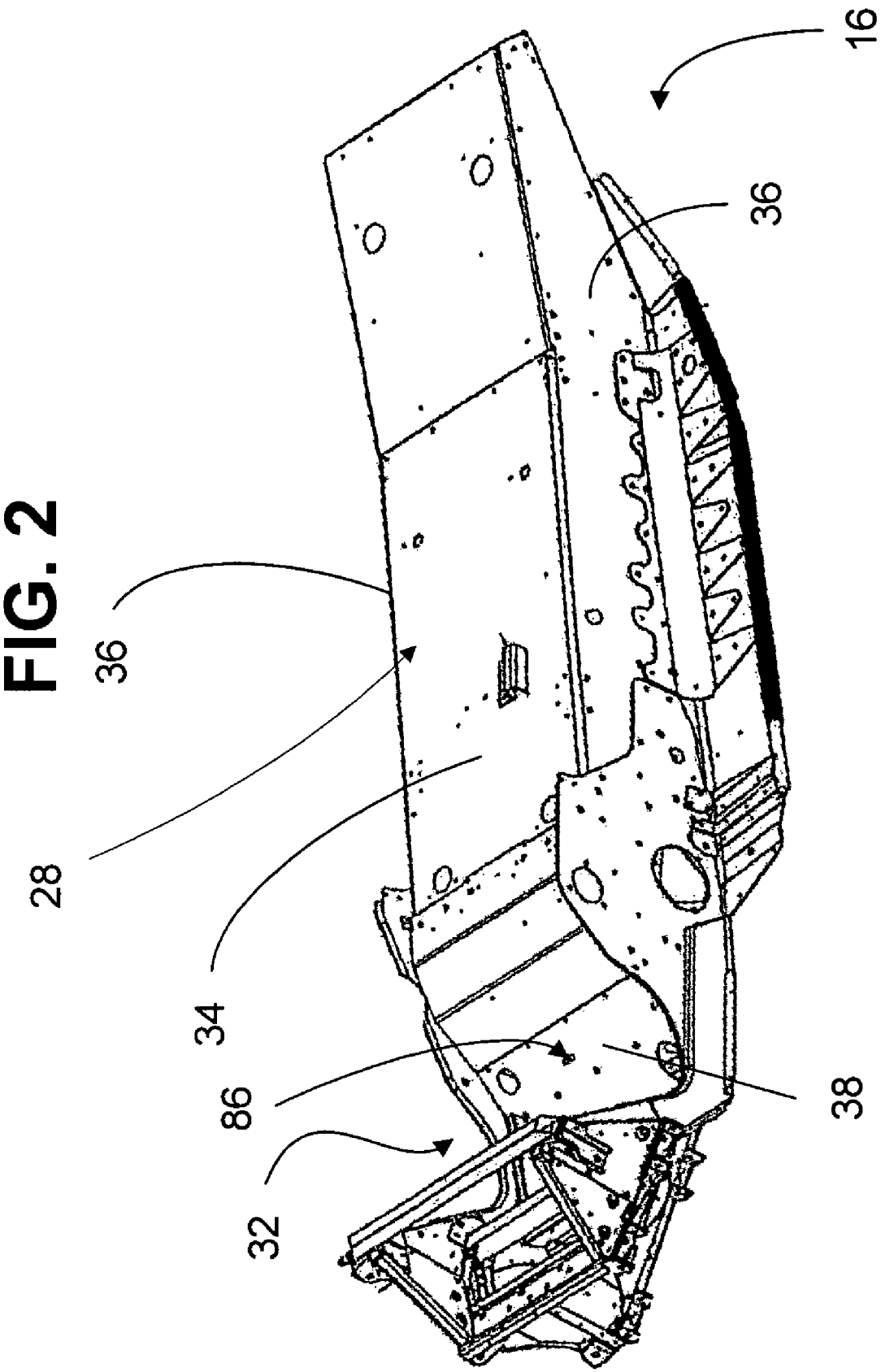
FIG. 2 is a perspective view of a snowmobile chassis of certain embodiments of the present invention.

Rearwardly of the skis 20 and beneath the seat 14, the chassis 16 suspends an endless track 12 by a rear suspension system 26. The endless track 12 is a propulsion-providing track system and is laterally centrally mounted under the chassis 16 in a longitudinally extending drive tunnel 28. The track 12 is driven by the engine 30 positioned in the bulkhead 32 (FIG. 2). The track 12 is a belt-type tread that rotates around the periphery of the rear suspension system 26 to propel the snowmobile 10 through the snow. The belt-type tread has a plurality of spaced ribs that extend from the exterior surface of the track 12. The ribs provide traction to the endless track 12. Any suitable endless track system may be used with the present invention.

The rear portion of the snowmobile includes the rear suspension system 26 for supporting the rear portion of the snowmobile 10 and defining the path of the track 12 that propels the sled across the snow. The rear suspension includes a front suspension arm and a rear suspension arm, each such arm extending downwardly and rearwardly from pivotal connections to the chassis. The lower end of each such arm is secured, directly or indirectly, to the suspension rails, beneath which the track slides. Springs and shock absorbers are typically provided to urge the slide rails down and away from the snowmobile tunnel, the springs and shocks acting to control the relative movement of the suspension with respect to the tunnel as the snowmobile moves over terrain of varying contours. The relative lengths and orientation of the suspension arms also control the movement and orientation of the suspension as it is compressed upwardly toward the tunnel. Any suitable rear suspension system may be used with the present invention.

FIG. 2 illustrates a chassis 16 in accordance with the present invention. Beneath the operator's seat area and disposed around the endless drive track, the snowmobile 10 has a longitudinally extending drive tunnel 28. The drive tunnel includes a longitudinally extending top panel 34, which extends the length of the drive tunnel. The top panel 34 connects to generally downwardly extending sidewalls 36 that are positioned on opposite sides of the endless track so that the endless track is disposed within the drive tunnel. The panel 34 and extending sidewalls 36 may comprise a single sheet of material formed into the inverted U-shape of the drive tunnel. Preferably, the drive tunnel is constructed of aluminum.

The forward portion of the chassis 16 defines the bulkhead 32 for supporting the engine. The rear section of the bulkhead 32 includes a close-off panel 38 that is generally transverse to the vehicle and extends between the sidewalls 36 of the drive tunnel 28.

Figure 3:
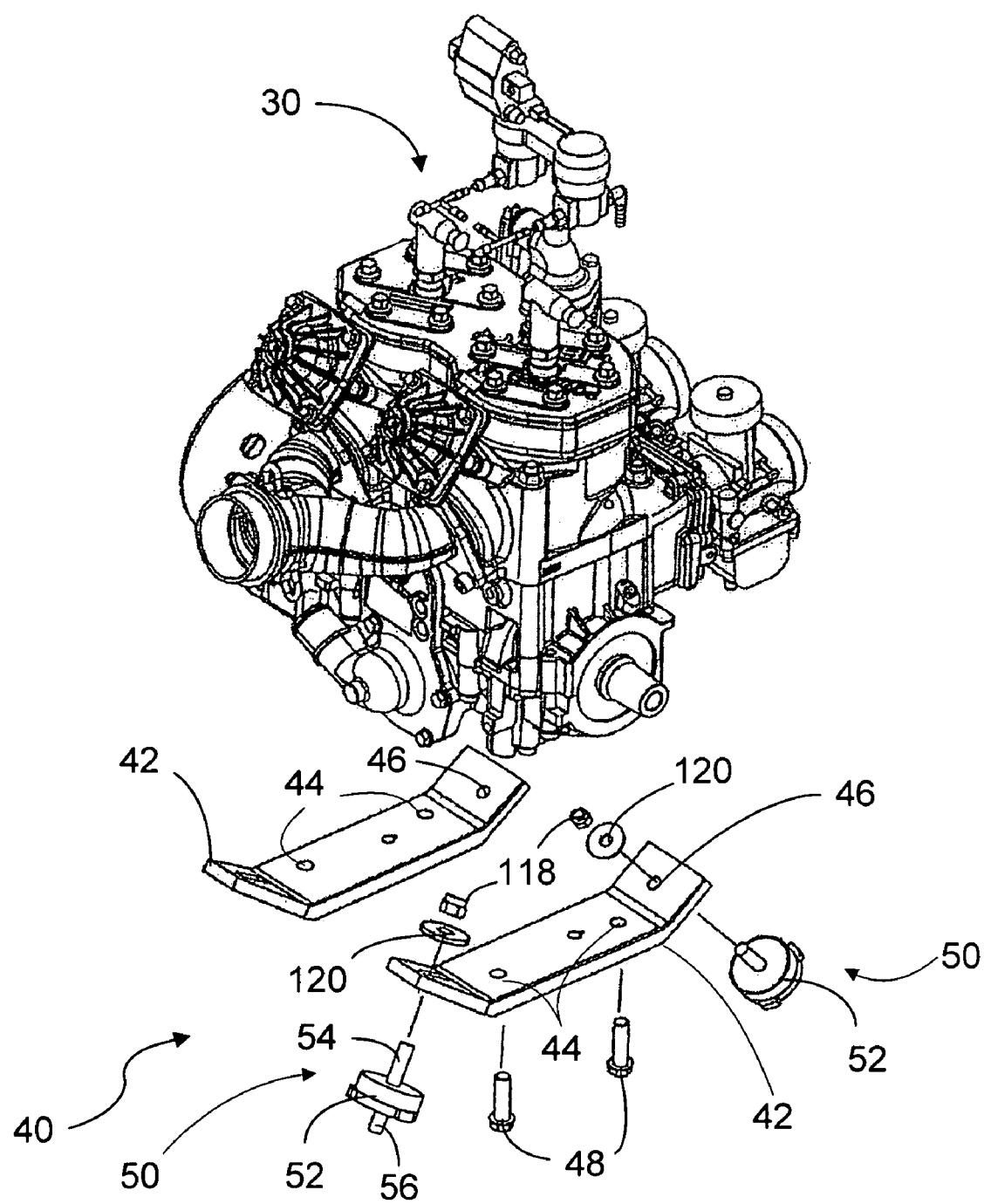
FIG. 3 is an exploded view showing an engine and an engine mount assembly of certain embodiments of the present invention.

With reference to FIG. 3, the engine 30 is mounted within the bulkhead 32 through a mount assembly 40. The mount assembly 40 includes engine support brackets 42 or straps that have two apertures 44 on the central portion of each bracket 42 and an end aperture 46 on each end of each bracket 42. Apertures 44 receive bolts 48 to fasten the support brackets 42 to the engine 30. The engine 30 and brackets 42 are mounted to the vehicle via the use of vibration absorbing elements 50. Vibration absorbing elements 50 are formed of a resilient element 52 (e.g., cylindrical, rectangular, etc.) sandwiched between top and bottom mounting studs 54, 56. End apertures 46 receive the top mounting studs 54 and are secured into place about the engine support bracket using nuts 118 and washers 120 so that the vibration absorbing elements 50 are fastened to and support the engine support brackets 42. The bottom-mounting studs 56 may be attached to the vehicle as described below. It is understood, however, that other engine mounting assembly configurations are within the scope of embodiments of the invention. For instance, resilient element 52 could be eliminated or relocated to the interface between brackets 42 and engine 30. In addition, brackets 42 could be eliminated or incorporated into the engine itself, such that the vibration absorbing elements are mounted directly into the engine.

Figure 4:
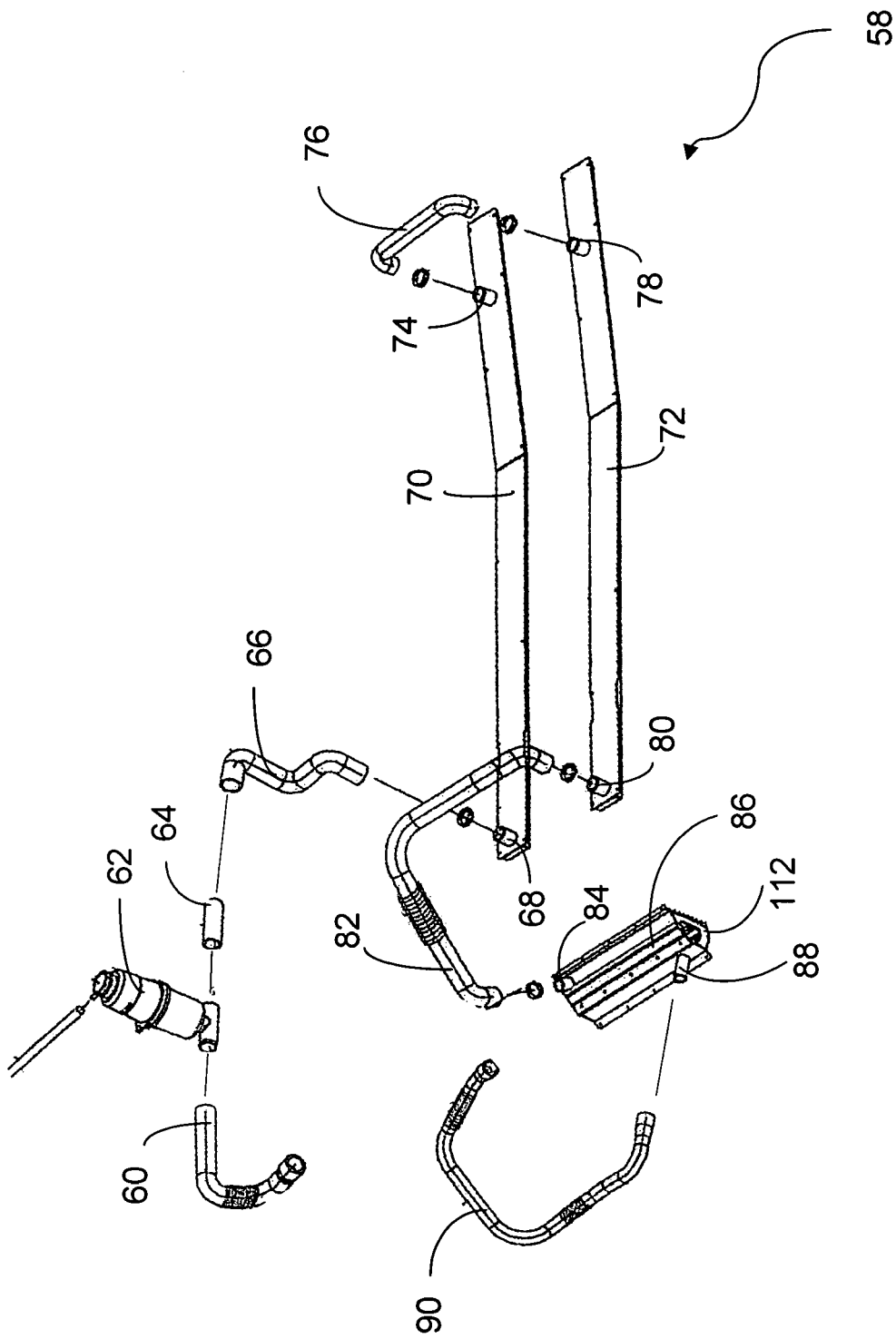
FIG. 4 is an exploded view showing a snowmobile cooling system incorporating a heat exchanger according to certain embodiments of the present invention.

In certain embodiments, the engine 30 is liquid-cooled by a liquid cooling system 58, which contains internal passages for carrying liquid coolant that absorbs heat created by the engine during operation. A pump circulates liquid coolant (usually a water-ethylene glycol mixture) from the internal passages of the engine (where heat generated by the engine would be absorbed by the coolant) to several heat exchangers, where heat is dissipated. The engine drives the pump. The coolant flows in a closed path or fluid circuit back to the engine 30. Referring to FIG. 4, coolant is pumped out from the engine into a hose 60, through overflow reservoir bottle 62, through hoses 64 and 66, and then into the inlet 68 of wear strip cooler 70. Wear strip coolers 70, 72 are positioned within tunnel 28 on the underside of top panel 34. The wear strip cooler 70 is positioned on the right side of the tunnel 28 wherein the wear strip cooler 72 is positioned on the left side of the tunnel 28. From the wear strip cooler 70, the coolant flows out of outlet 74 into a crossover tube 76. From tube 76, coolant flows through an inlet 78 into a third heat exchanger, wear strip cooler 72. From the wear strip cooler 72, the coolant flows out of outlet 80 and into tube 82. From tube 82, coolant flows into the inlet 84 of heat exchanger 86, which is a front heat exchanger positioned on the front portion of the drive tunnel. Coolant then circulates in a serpentine fashion through heat exchanger 86, as described further below, and flows out the outlet 88 of heat exchanger 86 and into another tube 90. Tube 90 leads back to the engine 30. The engine 30 includes a pump to circulate the liquid coolant. However, the pump could instead be separate from the engine as is known. Other coolant circulation designs are within the scope of the invention. For instance, the circulation designs disclosed in U.S. Pat. Nos. 6,681,724 and 6,109,217, both assigned the assignee of the present invention hereby incorporated herein by reference, could be used in certain embodiments of the present invention.

Each of the heat exchangers is preferably made of a thermally conductive material such as aluminum that allows heat to be conducted from the coolant to the heat exchangers. The side coolers 70, 72 are preferably made of extruded aluminum.

Figure 5:
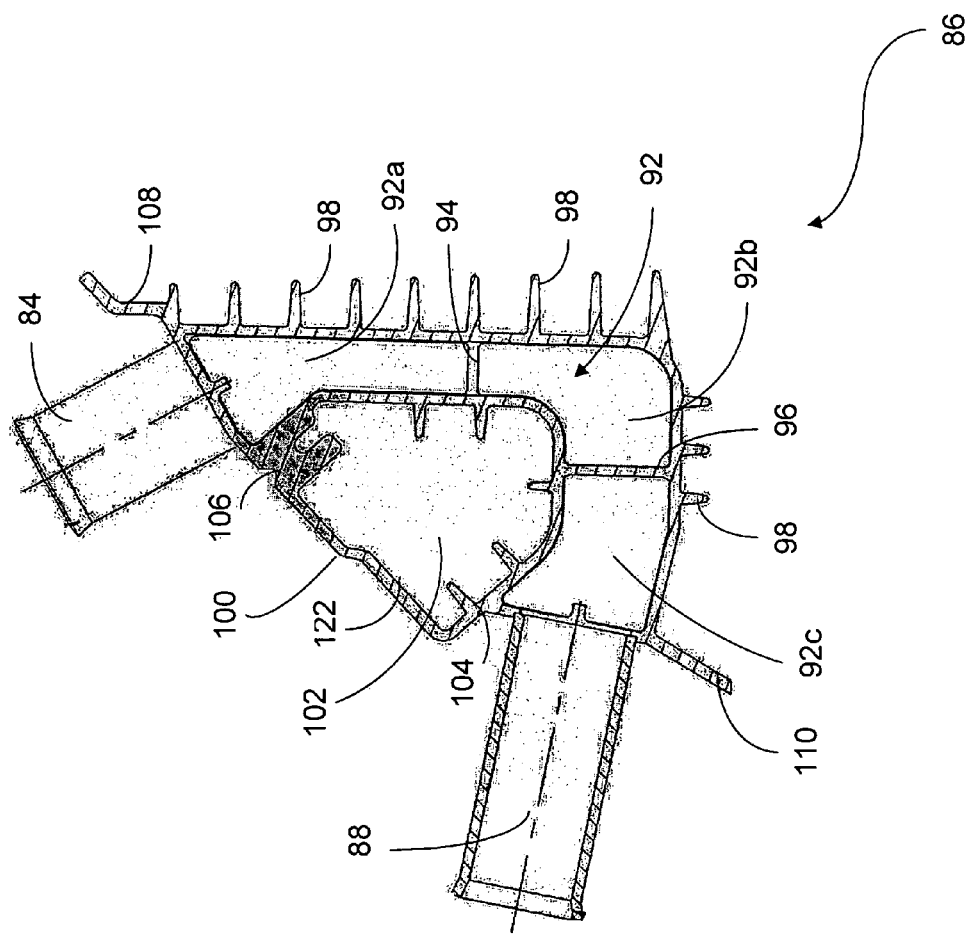
FIG. 5 is sectional view of a heat exchanger according to certain embodiments of the invention.

A sectional view of heat exchanger 86 is depicted in FIG. 5. The heat exchanger 86 also functions as an engine mount and is configured to support the engine. In addition, heat exchanger 86 is designed to be a relatively rigid or stiff structure. By connecting the relatively rigid heat exchanger 86 to the chassis 16, heat exchanger increases the rigidity of the chassis and reinforces it to prevent bending, buckling, or twisting of the chassis under normal operating stresses and loads. With reference to FIG. 5, in the illustrated embodiment, the heat exchanger 86 has an inlet via tube 84 and an outlet via tube 88. Heat exchanger 86 includes a sealed hollow cooling conduit 92 for receiving and holding fluid (e.g., coolant). Cooling conduit 92 is a sealed reservoir that holds the coolant or other fluid within its interior passage defined by the interior faces of the walls of the conduit 92. The cooling conduit 92 is "L-shaped" as shown in FIG. 5. However, as described below, other shapes are within the scope of the invention.

Cooling conduit 92 includes support bars 94 and 96. Support bars 94 and 96 provide additional reinforcement and support for exchanger 86. Support bars 94 and 96 split cooling conduit 92 into three sections, sections 92a, 92b, and 92c. However, support bars 94 and 96 have channels or apertures machined into them to provide fluid communication paths between conduit sections 92a, 92b, and 92c. In this way, coolant flows in a serpentine manner through sections 92a, 92b, and 92c and the apertures in support bars 94 and 96 that fluidly connect these conduit sections. In alternate embodiments, support bars 94 and 96 could be eliminated, providing a single reservoir 92 within heat exchanger 86. In other embodiments, the flow path through heat exchanger 86 may be modified as is known. One or more fins 98 are provided on an external surface of the heat exchanger 86. The fins 98 are preferably formed integrally with the heat exchanger 86 and extend outward from the heat exchanger 86 as is known in the art. During operation of the snowmobile, snow and air are circulated by the drive track within the drive tunnel and the snow can accumulate on the fins 98. A heat transfer occurs between the cold snow on the outer surface and the warm coolant within conduit 92. Conduction through the heat exchanger 86 cools the coolant that is circulated through heat exchanger 86.

As may be seen in FIG. 5, heat exchanger 86 includes a reinforced portion 100 that closes the ends of the cooling conduit upon itself for added strength and rigidity. That is, reinforced portion 100 extends between the legs of the L-shaped cooling conduit 92 to form a generally triangular-shaped cross-section shown in FIG. 5. By closing the heat exchanger on itself, reinforced portion 100 creates a heat exchanger 86 having increased rigidity. A hollow cavity 102 is created interior to the reinforced portion 100 but exterior to the cooling conduit. Stiffening ribs 104 are located within the cavity 102 for increasing the stiffness or rigidity of heat exchanger 86. Such ribs span the heat exchanger 86 from its right to left extents on the vehicle to increase the strength of the heat exchanger 86. Ribs 104 also provide increased heat exchanging surface area. As will be described below, the single layer of reinforced portion 100 more easily permits the inclusion of a threaded aperture or receptacle 106. This threaded aperture 106 is used for receiving and retaining mounting stud 56 of the vibration-absorbing element 50 described above. In this respect, the engine mounting assembly connects to and mounts to heat exchanger 86, and heat exchanger 86 provides rigidity to support the engine in position. Although not shown in the cross-section in FIG. 5, heat exchanger 86 includes two threaded apertures 106, one on the right side of the heat exchanger 86 and one on the left side of the heat exchanger 86. In this respect, heat exchanger provides mounting receptacles for both the right and left engine straps 42 shown in FIG. 3.

As shown in FIG. 5, heat exchanger 86 also includes an upper and lower panel mounting portions 108 and 110 that, as are described below, are used to mount heat exchanger 86 to the vehicle chassis. In certain embodiments, the heat exchanger 86 is formed as a single piece. Most of heat exchanger 86 may be formed from a single extrusion in the shape of the cross-section shown in FIG. 5 for increased strength. End plates 112, as shown on heat exchanger 86 in FIG. 4, may be added to the right and left ends of the extrusion to close and seal off conduit 92. End plates do not seal off and close cavity 102, however, allowing for airflow through this cavity to provide additional cooling. Of course, in other embodiments, end plates could seal off and close cavity 102 as well as conduit 92 ends. By creating the reinforced portion 100 and the conduit 92 as one part as opposed to two parts reduces material and assembly cost. Of course, in other embodiments, additional parts can be joined together to form the heat exchanger 86.

Figure 6:
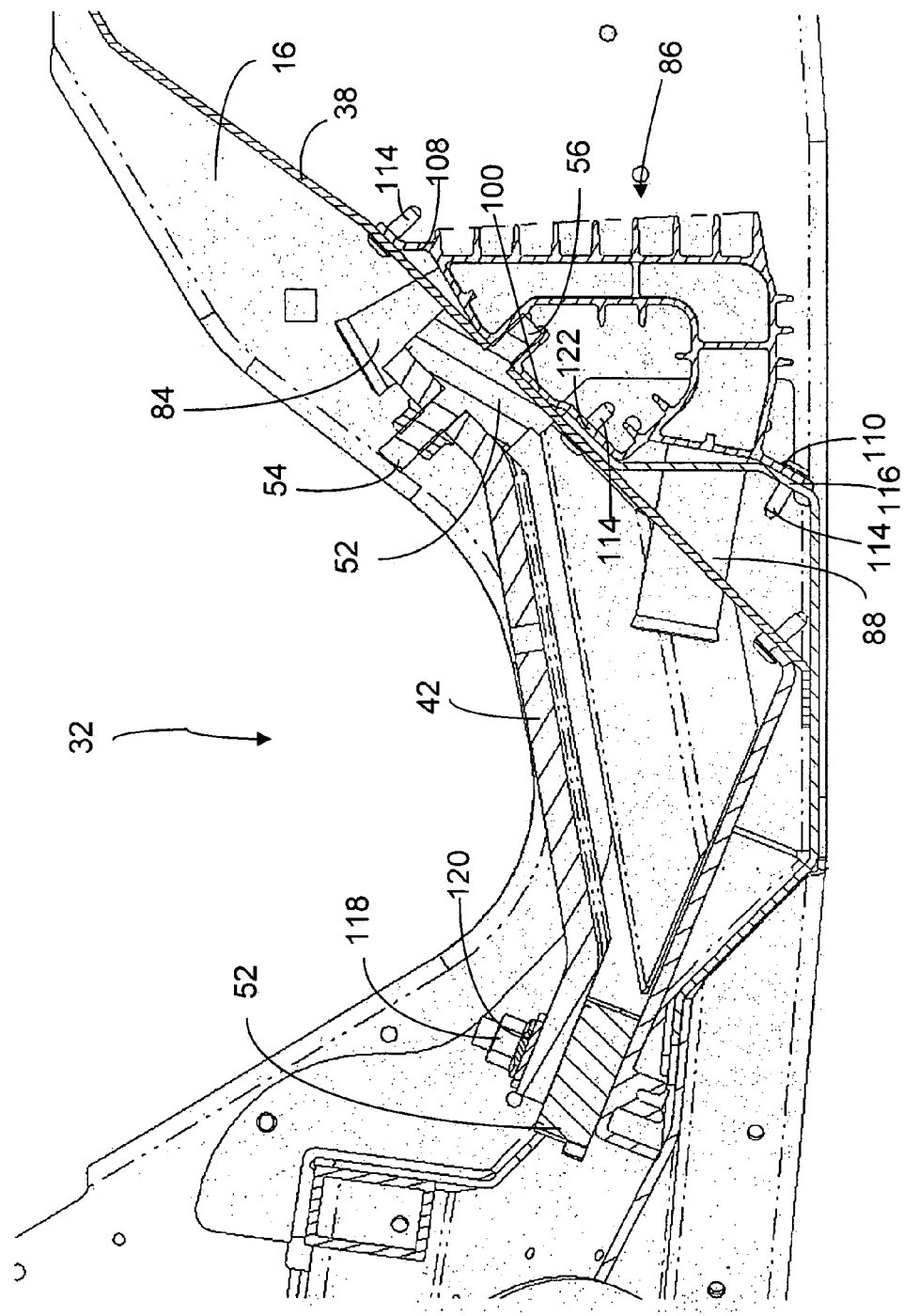
FIG. 6 is a sectional view of a snowmobile chassis incorporating a heat exchanger and engine mount assembly according to certain embodiments of the invention.

A section view of the chassis 16 incorporating the heat exchanger 86 and engine mount assembly 40 according to certain embodiments of the invention is shown in FIG. 6. Heat exchanger 86 is mounted on the rearward side of close-off panel 38 via the use of rivets 114 that extend through upper and lower panel mounting portions 108 and 110. Upper rivet 114 extends through the close-off panel 38 and lower rivet 114 extends through the floor portion 116 of the bulkhead 32 of the chassis 16. Mounted in this position, reinforced portion 100 of heat exchanger 86 partly conforms to and rests against the rearward side of close-off panel 38. The reinforced portion 100 lends rigidity to this portion of the close-off panel 38. That is, the rigidity of heat exchanger 86 mounted in this manner restricts close-off panel 38 from bending or twisting due to movement of the engine 30 or from stresses and loads placed on the chassis during normal snowmobile operation. Heat exchanger 86, mounted in this manner, is designed to add rigidity to the entire chassis 16 beyond merely the close-off panel 38. The heat exchanger 86, including its reinforced portion 100, provide a rigid structure due to several of its design features, including that its closure onto itself that forms open-air cavity 102, its stiffening ribs 104, internal support bars 94 and 96, unitary design (e.g., cross-section formed of a single extrusion or a single piece), metal construction, etc. The relative rigidity of the heat exchanger 86 is then used to reinforce the entire chassis based on the manner and placement of the mounting of heat exchanger 86 to the chassis. For instance, since heat exchanger 86 mounts to multiple panels that form the bulkhead 32 portion of the chassis 16 (e.g., close-off panel 38, floor portion 116), the rigidity of heat exchanger 86 reinforces multiple portions of the chassis 16 to strengthen the entire chassis. The added strength and stiffness helps prevent the chassis 16 from bending, twisting or buckling under normal operating loads.

As shown in FIG. 6, vibration-absorbing element 50 connects engine support bracket 42 to heat exchanger 86 through a hole in close-off panel 38. Bottom stud 56 of element 50 extends through the hole in panel 38 and threadably engages threaded aperture 106 in heat exchanger 86. Upper mounting stud 54 of element 50 extends through the rearward end aperture 46 in engine support bracket 42 and is bolted in place via nut 118 and washer 120. Resilient member 52 is positioned in between bracket 42 and close-off panel 38. Of course, connectors other than element 50 may be used to attach bracket 42 to exchanger 86. Reinforced portion 100 includes a portion 122 spaced slightly away from the rear side of close off panel 38. Portion 122 permits the insertion and attachment of floor 116 to close-off panel 38 and exchanger 86 via another rivet 114, as shown in FIG. 6. Accordingly, these attachments between the more rigid heat exchanger 86 and the chassis wall formed by close off panel 38 via element 50 and rivets 114 add rigidity to the chassis without the addition of a separate structural member dedicated for this purpose. As engines increase in size and weight, the space savings in the chassis created by integrated engine mount and heat exchanger 86 provided multiple advantages.

The forward end of support bracket 42 is mounted to forward portion of chassis 32 via another element 50. Instead of providing chassis reinforcement via a heat exchanger, chassis 32 is reinforced without a heat exchanger on the forward end of bracket 42. Although the sectional view shown in FIG. 6 shows only one support bracket 42, two such support brackets 42 are used, as shown in FIG. 3, one on the right side of heat exchanger 86 and one on the left side of heat exchanger 86. In this respect, heat exchanger 86 provides mounting receptacles for both the right and left support brackets 42 shown in FIG. 3.

Accordingly, certain embodiments of the invention provide a heat exchanger extrusion that is used as both a motor mount extrusion and cooling extrusion. The combined extrusion is positioned on the back side of the close off panel 38 of the chassis 16. One skilled in the art will appreciate that the present invention can be practiced with embodiments other than those disclosed. For instance, the heat exchanger 86 is described as being connected within the engine coolant circuit that circulates liquid coolant through the engine. However, heat exchanger 86 may be used as a cooler for other purposes. In one embodiment, heat exchanger 86 may be an oil cooler configured in line with the oil coolant circuit for a four-stroke engine to cool the engine oil. In another embodiment, heat exchanger 86 may be an air intercooler configured in a turbocharged engine intake system that cools engine intake air for better compression.

Thus, embodiments of the integrated heat exchanger and engine mount are disclosed. The disclosed embodiments are presented for purposes of illustration and not limitation, and the present invention is limited only by the claims that follow.

What is claimed is:

1. A snowmobile, comprising:
   a chassis, an engine supported by the chassis, a drive track, the engine coupled to a drive train for propelling the drive track, a pair of steerable skis suspended from the chassis, and a straddle type seat supported by the chassis;
   a heat exchanger including a reinforced portion for supporting the engine, the heat exchanger mounted to the chassis and containing an inner passage for carrying heat absorbing fluid, the heat exchanger having a heat exchanging outer surface for dissipating heat from fluid carried by the inner passage; and
   an engine mounting assembly mounting the engine to the chassis and including a resilient member to dampen engine vibration, the engine mounting assembly including a connector operatively connected to the engine that directly connects to the reinforced portion of the heat exchanger to mount the engine to the chassis.

2. The snowmobile of claim 1, wherein the heat exchanger is operatively connected in fluid communication with the engine and carries an engine fluid.

3. The snowmobile of claim 2, wherein the engine fluid is liquid coolant.

4. The snowmobile of claim 1, wherein the heat exchanger is mounted adjacent to the drive track and in the path of snow circulated by the drive track during operation.

5. The snowmobile of claim 4, wherein the heat exchanger is mounted forward of the drive track.

6. The snowmobile of claim 1, wherein the engine mounting assembly includes an engine strap connected to the engine, and the resilient member is connected between the engine strap and the heat exchanger.

7. The snowmobile of claim 1, wherein the inner passage is L-shaped and the reinforced portion forms a generally triangular shape with the L-shaped inner passage.

8. The snowmobile of claim 1, wherein the reinforced portion of the heat exchanger is positioned adjacent a chassis wall to increase the rigidity of the chassis wall.

9. The snowmobile of claim 8, wherein the connector couples the engine, the reinforced portion of the heat exchanger, and the chassis wall together to support the engine.

10. The snowmobile of claim 8, wherein the chassis includes a rear portion forming an inverted U-shaped drive tunnel, the chassis wall being generally transverse to the vehicle and located at a forward end of the drive tunnel to form a close-off panel.

11. The snowmobile of claim 8, wherein the engine mounting assembly includes an engine support connected to the engine, and the chassis wall is positioned between the reinforced portion of the heat exchanger and the engine support.

12. The snowmobile of claim 8, wherein the reinforced portion of the heat exchanger is shaped to conform to the chassis wall to increase the rigidity of the chassis wall.

13. The snowmobile of claim 1, wherein the heat exchanger is formed to include an interior cavity to increase the rigidity of the heat exchanger, the heat exchanger being mounted to the chassis to increase the rigidity of the chassis.

14. The snowmobile of claim 13, wherein the heat exchanger include a plurality of stiffening ribs that extend into the interior cavity to increase the rigidity of the heat exchanger.

15. The snowmobile of claim 1, wherein the heat exchanger is coupled to the chassis at a plurality of locations to increase the rigidity of the chassis.

16. The snowmobile of claim 1, wherein the chassis is formed from a plurality of panels and the heat exchanger is coupled to multiple chassis panels to reinforce the multiple chassis panels to increase the rigidity of the chassis.

17. An integrated engine mount and heat exchanger for a vehicle comprising a heat exchanger having an outer surface configured to dissipate heat from within the heat exchanger, an inner passage for carrying heat absorbing fluid, and a reinforced engine mount portion formed integrally with the heat exchanger and having an aperture configured to receive an engine mount connector to couple the heat exchanger to the engine.

18. The integrated engine mount and heat exchanger of claim 17, wherein the inner passage and the reinforced engine mount portion form a generally triangular shape with the inner passage forming two of the sides of the triangular shape and the reinforced engine mount portion forms the third side of the triangular shape.

19. The integrated engine mount and heat exchanger of claim 17, wherein the reinforced engine mount portion connects to the inner passage to form an open-air cavity.

20. The integrated engine mount and heat exchanger of claim 17, wherein the inner passage is sealed off from the reinforced engine mount portion.

21. The integrated engine mount and heat exchanger of claim 17, wherein the aperture is defined by a threaded portion that threadably receives the engine mount connector.

22. The integrated engine mount and heat exchanger of claim 17, further including an inlet and an outlet through which the heat exchange fluid is circulated.

23. The integrated engine mount and heat exchanger of claim 17, wherein the reinforced engine mount portion and the inner passage are formed from a single extrusion.

24. The integrated engine mount and heat exchanger of claim 17, wherein the outer surface of the heat exchanger is formed to include a plurality of cooling fins.

25. A vehicle comprising:
a chassis;
an engine supported by the chassis;
a heat exchanger coupled to the chassis, the heat exchanger comprising an integrally formed reinforced engine mount portion configured to support the engine, an inner passage configured to receive heat exchange fluid, and a heat exchanging outer surface configured to dissipate heat from the fluid in the inner passage; and
an engine mounting assembly configured to couple the engine to the chassis, the engine mounting assembly comprising a resilient member to dampen engine vibration, and a connector having a first portion coupled to the engine and a second portion coupled to the reinforced engine mount portion of the heat exchanger.

26. The vehicle of claim 25, wherein the reinforced engine mount portion of the heat exchanger is positioned adjacent a chassis wall to increase the rigidity of the chassis wall, and wherein the engine mounting assembly includes an engine support connected to the engine, the chassis wall being positioned between the reinforced portion of the heat exchanger and the engine support.

27. The vehicle of claim 25, wherein the heat exchanger is formed to include a interior cavity to increase the rigidity of the heat exchanger, the heat exchanger being mounted to the chassis to increase the rigidity of the chassis.

28. An integrated engine mount and heat exchanger for a vehicle comprising a heat exchanger having an outer surface configured to dissipate heat from within the heat exchanger, an inner passage for carrying heat absorbing fluid, and a reinforced engine mount portion having an aperture configured to receive an engine mount connector to couple the heat exchanger to the engine, and wherein the inner passage and the reinforced engine mount portion form a generally triangular shape with the inner passage forming two of the sides of the triangular shape and the reinforced engine mount portion forms the third side of the triangular shape.

* * * * *